US009450240B2

(12) United States Patent
Lim

(10) Patent No.: US 9,450,240 B2
(45) Date of Patent: Sep. 20, 2016

(54) SECONDARY BATTERY

(75) Inventor: Wan Mook Lim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 365 days.

(21) Appl. No.: 12/417,068

(22) Filed: Apr. 2, 2009

(65) Prior Publication Data
US 2009/0325061 A1 Dec. 31, 2009

(30) Foreign Application Priority Data

Jun. 30, 2008 (KR) .................................. 2008-62673

(51) Int. Cl.
*H01M 4/48* (2010.01)
*H01M 4/583* (2010.01)
*H01M 4/505* (2010.01)
*H01M 4/134* (2010.01)
*H01M 4/38* (2006.01)
*H01M 4/485* (2010.01)
*H01M 4/525* (2010.01)
*H01M 10/052* (2010.01)
*H01M 4/1395* (2010.01)

(52) U.S. Cl.
CPC ............. *H01M 4/505* (2013.01); *H01M 4/134* (2013.01); *H01M 4/38* (2013.01); *H01M 4/485* (2013.01); *H01M 4/525* (2013.01); *H01M 10/052* (2013.01); *H01M 4/1395* (2013.01); *Y02E 60/122* (2013.01)

(58) Field of Classification Search
CPC ............................. H01M 4/48; H01M 4/583
USPC ....... 429/223, 224, 231.95, 231.6, 163, 324, 429/341, 343, 330, 332, 333, 338
See application file for complete search history.

(56) References Cited

U.S. PATENT DOCUMENTS

| 6,451,473 | B1 * | 9/2002 | Saito et al. ..................... 429/94 |
| 6,485,864 | B1 * | 11/2002 | Miyazawa .............. C01B 31/04 423/448 |
| 6,589,696 | B2 * | 7/2003 | Matsubara et al. ........ 429/231.8 |
| 7,341,805 | B2 | 3/2008 | Ueda et al. |
| 2005/0019659 | A1 | 1/2005 | Shiozaki et al. |
| 2006/0068290 | A1 | 3/2006 | Sawa et al. |
| 2007/0037063 | A1 | 2/2007 | Choi et al. |

(Continued)

FOREIGN PATENT DOCUMENTS

| CN | 1199300 C | 4/2005 |
| CN | 101095251 A1 | 12/2007 |

(Continued)

OTHER PUBLICATIONS

Office action, with English translation, dated Mar. 29, 2011 for corresponding Chinese Patent Application No. 200910135286.3.

(Continued)

*Primary Examiner* — Ula C Ruddock
*Assistant Examiner* — Thomas Parsons
(74) *Attorney, Agent, or Firm* — Lewis Roca Rothgerber Christie LLP

(57) ABSTRACT

A secondary battery including: an anode including a positive electrode active material; a cathode including a negative electrode active material; a separator interposed between the anode and the cathode; and a non-aqueous electrolyte. The positive electrode active material includes a lithium nickel oxide, and the negative electrode active material includes at least one silicon compound selected from the group consisting of silicon, a silicon oxide, and a silicon alloy.

11 Claims, 2 Drawing Sheets

(56) References Cited

U.S. PATENT DOCUMENTS

| | | |
|---|---|---|
| 2007/0054192 A1 | 3/2007 | Koga et al. |
| 2007/0065720 A1 | 3/2007 | Hasegawa et al. |
| 2007/0148550 A1 | 6/2007 | Hasegawa et al. |
| 2007/0190419 A1 | 8/2007 | Takezawa |
| 2007/0281216 A1 | 12/2007 | Petrat et al. |
| 2008/0113266 A1 | 5/2008 | Park et al. |
| 2008/0118837 A1 | 5/2008 | Shirane et al. |
| 2008/0135801 A1* | 6/2008 | Kizaki et al. .............. 252/182.1 |
| 2008/0160412 A1 | 7/2008 | Kasamatsu et al. |

FOREIGN PATENT DOCUMENTS

| | | |
|---|---|---|
| EP | 1 742 281 A1 | 1/2007 |
| JP | 2000-21392 | 1/2000 |
| JP | 2001-210326 A | 8/2001 |
| JP | 2006-120612 | 5/2006 |
| JP | 2007-059213 | 3/2007 |
| JP | 2007-073425 | 3/2007 |
| JP | 2007-200862 A | 8/2007 |
| KR | 10-2005-0086713 | 8/2005 |
| KR | 10-2006-0051556 | 5/2006 |
| KR | 10-2007-0110119 | 11/2007 |
| KR | 10-2008-0073087 | 5/2008 |
| WO | WO98/53511 * | 11/1998 |
| WO | WO 02/40404 A1 | 5/2002 |
| WO | WO 2006/098216 A1 | 9/2006 |
| WO | WO 2006/109495 A1 | 10/2006 |

OTHER PUBLICATIONS

KIPO Office action dated Oct. 19, 2011, for Korean priority Patent application 10-2008-0062673, noting listed Korean reference in this IDS, 3 pages.
Japanese Office action dated Feb. 21, 2012, for corresponding Japanese Patent application 2009-154992, 3 pages.
Patent Abstracts of Japan, and English machine translation of Japanese Publication 2000-21392, listed above, 11 pages.
KIPO Notice of Allowance dated Feb. 1, 2012, for Korean priority Patent application 10-2008-0062673, 5 pages.
Japanese Office action dated Jun. 19, 2012, for corresponding Japanese Patent application 2009-154992, (7 pages).
JPO Decision of Refusal dated Jul. 23, 2013 for corresponding JP Patent Application No. 2009-154992 (6 pages).
Machine English Translation of JP 2001-210326 A (11 pages).

* cited by examiner

SECONDARY BATTERY

CROSS-REFERENCE TO RELATED APPLICATIONS

This application claims the benefit of Korean Application No. 2008-62673, filed Jun. 30, 2008 in the Korean Intellectual Property Office, the disclosure of which is incorporated herein, by reference.

BACKGROUND OF THE INVENTION

1. Field of the Invention

Aspects of the present invention relate to a negative electrode active material and a secondary battery including the same.

2. Description of the Related Art

Research into secondary batteries is currently being conducted, with an emphasis towards producing a secondary battery that is ultra-light weight, has a high-energy density, a high-output voltage, a low self-discharge rate, is environmentally friendly, and has a long lifespan. A secondary battery may be broadly classified as a nickel-hydrogen (Ni-MH) battery or a lithium ion (Li-ion) battery, depending on the type of electrode active material included therein. Particularly, a lithium ion battery may be categorized according to the type of electrolyte included therein, e.g., a liquid electrolyte, a solid polymer electrolyte, or a gel-like electrolyte. Further, a secondary battery may be further classified according to the type of container that houses an electrode assembly, such as a can-type, a pouch-type, and the like A lithium ion battery has a higher energy density per unit weight and a higher average voltage (3.6V/cell) than other types of secondary batteries, such as a NiCad battery and a nickel/hydrogen battery, which have an average voltage of 1.2V. Further, a lithium ion battery exhibits a variety of advantages, such as a self-discharge rate of less than 5% per month, at 20° C., which is about ⅓ the self-discharge rate of a NiCad battery or a nickel/hydrogen battery. In addition, lithium ion batteries are environmentally friendly, as they do not include heavy metals, such as cadmium (Cd) and mercury (Hg), and are capable of being charged and discharged more than 1000 times, under normal operation conditions. Recent advancements of information and communication technologies have provided a strong demand for the rapid development of improved lithium ion batteries.

Generally, a secondary battery is fabricated by placing an electrode assembly, composed of a positive electrode plate, a negative electrode plate, and a separator disposed therebetween, and an electrolyte, in a can made of aluminum or an aluminum alloy. An opening of the can is then sealed with a cap assembly.

Each of the positive electrode plate and negative electrode plate includes a positive electrode active material and a negative electrode active material, which are capable of reversibly intercalating lithium ions. The positive electrode active material can include lithium cobalt oxide, lithium manganese oxide, lithium nickel oxide, or the like.

The lithium nickel oxide generally has a low content of cobalt and therefore, is less susceptible to the fluctuation in the price of cobalt, as compared to the lithium cobalt oxide. In addition, lithium nickel oxide is more economical, due to having a high manganese content. To this end, a great deal of research has been actively focused on developing a positive electrode active material that includes a lithium nickel oxide compound.

However, lithium nickel oxide exhibits poor initial charge/discharge efficiency, and therefore, suffers from a large initial irreversible capacity. This results in a need for a comparatively larger amount of the negative electrode active material, leading to a reduction in battery capacity.

SUMMARY OF THE INVENTION

Aspects of the present invention provide a secondary battery having an enhanced capacity, due to having a significantly reduced amount of an negative electrode active material. The secondary battery includes a positive electrode active material that includes a lithium nickel oxide, which has a high irreversible capacity.

In accordance with an aspect of the present invention, provided is a secondary battery comprising: an anode including a positive electrode active material, a cathode including a negative electrode active material, a separator interposed between the anode and the cathode, and a non-aqueous electrolyte. The positive electrode active material includes a lithium nickel oxide. The negative electrode active material includes at least one selected from the group consisting of silicon, a silicon oxide, and a silicon alloy. The negative electrode active material may include SiO, and the positive electrode active material may include Ni, Co, and Mn.

According to aspects of the present invention, the positive electrode active material may have an irreversible capacity (relative to weight) that is larger than that of the negative electrode active material. More specifically, the irreversible capacity of the positive electrode active material, may be from 12 to 17 mAh/g higher than the irreversible capacity of the negative electrode active material. According to such a difference in the irreversible capacity, the content of at least one selected from the group consisting of silicon, a silicon oxide, and a silicon alloy may be in the range of 2 to 6% by weight, based on the total weight of the negative electrode active material.

According to aspects of the present invention, the non-aqueous electrolyte may include a lithium salt and a non-aqueous organic solvent. The lithium salt may be at least one selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_4$, $LiAlCl_4$, $LiN(C_xF_{2x+1}SO_2)(C_yF_{2y+1}SO_2)$ (x and y are natural numbers), $LiCl$, and $LiI$. The non-aqueous organic solvent may be at least one selected from the group consisting of a carbonate, an ester, an ether, and a ketone.

According to aspects of the present invention, provided is a secondary battery including an electrode assembly formed by winding the anode, the cathode, and a separator disposed therebetween. The secondary battery may further include a can for housing the electrode assembly and a cap assembly for sealing an opening of the can.

Aspects of the present invention provide a secondary battery having an improved capacity, due to having a significantly reduced amount of a negative electrode active material, even when a lithium nickel oxide is included in a positive electrode active material.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION OF THE EXEMPLARY EMBODIMENTS

Figure 1:
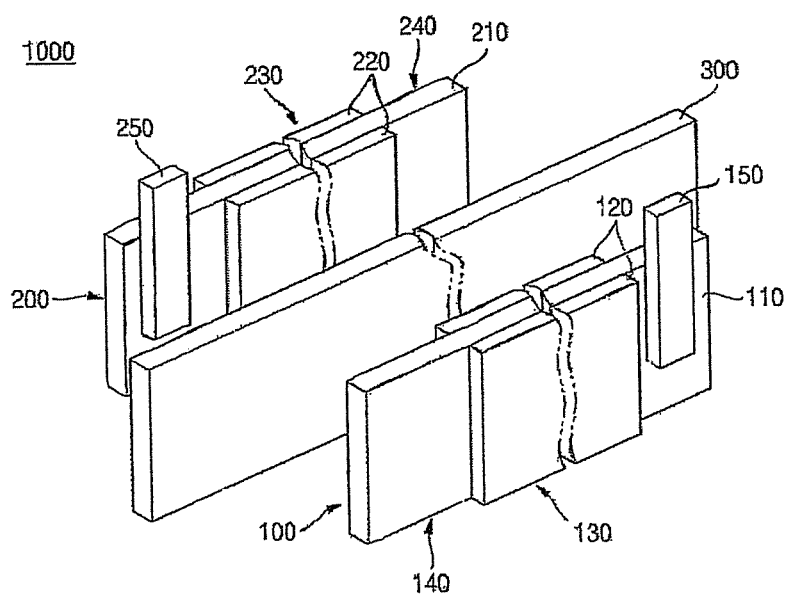
FIG. 1 schematically shows an exploded perspective view of an electrode assembly, accordance with one exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

Those skilled in the art will appreciate that various modifications, additions and substitutions are possible without departing from the scope and spirit of the invention as disclosed in the accompanying claims. Unless otherwise defined, all technical and scientific terms used herein have the same meaning as commonly understood by one of ordinary skill in the relevant art. It will be further understood that terms, such as those defined in commonly used dictionaries, should be interpreted as having a meaning that is consistent with their meaning in the context of the specification and relevant art, and should not be interpreted in an idealized or overly formal sense unless expressly so defined herein. Well-known functions or constructions may not be described in detail for brevity and/or clarity.

FIG. 1 is an exploded perspective view of an electrode assembly, according to aspects of the present invention. Referring to FIG. 1, an electrode assembly 1000 of a secondary battery, in accordance with one exemplary embodiment of the present invention. The electrode assembly 1000 includes an anode 100, a cathode 200, a separator 300, and a non-aqueous electrolyte (not shown).

The anode 100 includes a positive current collector 110, coated portions 120, and a positive electrode tab 150. The positive current collector 110 is formed of a rectangular aluminum foil. The coated portions 120 are formed by coating both sides of the positive current collector 110, a positive electrode active material 130. The positive electrode active material 130 can comprise a lithium nickel oxide. The lithium nickel oxide may comprise Ni, Co, and Mn (NCM-based compound). The NCM-based compound may be represented by the formula: $Li_aNi_xMn_yCo_zO_2$.

The positive current collector 110 includes non-coated portions 140, which are not coated with the positive electrode active material 130. The positive electrode tab 150 is fixed to one of the non-coated portions 140, by ultrasonic welding, for example. The positive electrode tab 150 is generally formed of nickel, and an upper end thereof protrudes above an upper end of the positive current collector 110.

The cathode 200 includes a negative current collector 210, a negative electrode tab 250, coated portions 220, and non-coated portions 240. The negative current collector 210 is made of a material that does not form an alloy with lithium, at a deposition potential of lithium metal in an organic electrolyte. For example, the negative current collector 210 may be formed of a rectangular copper foil.

The coated portions 220 are formed on opposing sides of the negative current collector 210, at a central portion thereof. The non-coated portions 240 are disposed at ends of the negative current collector 210. The negative electrode tab 250 protrudes upward from one of the non-coated portions 240, at an end of the negative current collector 210.

The coating portions 220 are formed by coating a negative electrode active material 230 on the negative current collector 210. The negative active material can include a binder and a material that can reversibly intercalate lithium ions, through an electrochemical reaction. Electrons can be collected by the negative current collector 210, and then fed to an external circuit.

Generally, a conventional secondary battery includes a larger amount of a negative electrode active material than a positive electrode active material. This is intended to prevent the deposition of lithium on the cathode. In other words, the irreversible capacity of the negative electrode active material is higher, so the capacity of the positive electrode active material may not be completely achieved. In order to avoid such a problem, a capacity of the negative electrode active material is generally higher than that of the positive electrode active material.

According to aspects of the present invention, provided is a secondary battery (not shown) including the electrode assembly 1000 having the lithium nickel oxide as a positive electrode active material 130. The lithium nickel oxide has a higher initial discharge capacity, as compared to lithium cobalt oxide, and therefore, a smaller amount of the lithium nickel oxide can provide the same capacity as a larger amount of the lithium cobalt oxide. However, an initial irreversible capacity of the lithium nickel oxide is higher than that of the negative active material. Therefore a relatively larger amount of the negative active material is generally used.

Generally when the lithium nickel oxide is used as a positive electrode active material, the capacity of the negative electrode active material should be 1.2 to 1.3 times higher than that of the positive electrode active material. However, including a relatively larger amount of the negative electrode active material results in a decreased capacity of the secondary battery. In a secondary battery, in accordance with one exemplary embodiment of the present invention, the negative electrode active material 230 includes at least one silicon compound having a high irreversible capacity. The silicon compound can be selected from the group consisting of silicon, a silicon oxide, and a silicon alloy. In some embodiments, the silicon oxide is SiO.

The silicon compound consumes the irreversible capacity of the anode 100. Accordingly, even when a small amount of the silicon compound included in the negative electrode active material, the capacity of the negative electrode active material is 1.1-fold higher than that of the positive electrode active material. In addition, a depth of charge is obtained that corresponds to when the negative electrode active material capacity is 1.2 to 1.3 times higher than the capacity of the positive electrode active material. That is, the secondary battery including silicon oxide can achieve a higher cell capacity, as compared to a secondary battery without such a silicon compound. As a consequence, the amount of the negative electrode active material can be decreased, so the capacity of the secondary battery is correspondingly increased. Table 1, below, shows the irreversible capacities of a variety of positive electrode active materials and negative electrode active materials.

TABLE 1

|  | LCO | NCM523 | Graphite | SiO |
|---|---|---|---|---|
| Initial charge capacity (mAh/g) | 160 | 190 | 386 | 3000 |
| Initial discharge capacity (mAh/g) | 156 | 167 | 360 | 1000 |

The negative electrode active material may include from about 2 to 6% by weight of the silicon oxide, based on the total weight of the negative electrode active material. If the content of the silicon material is lower than about 2% by weight, the irreversible capacity of the positive electrode active material may not be sufficiently consumed, which results in the deposition of lithium on the cathode. On the other hand, if a content of the silicon material is higher than 6% by weight, it may be difficult to achieve a desired battery capacity. The negative electrode active material has a larger irreversible capacity, by weight, relative to the weight of the positive electrode active material, due to the silicone oxide.

The separator 300 is formed of a porous material that is permeable to ions and is electrically insulating. For example, the separator 300 may be formed of polyethylene (PE), polypropylene (PP), or a composite film thereof. Further, the separator 300 is generally wider than the anode 100 and cathode 200, so as to prevent a short circuit that may possibly occur at the top and bottom edges of the anode 100 and the cathode 200.

The non-aqueous electrolyte includes a lithium salt and a non-aqueous organic solvent. The non-aqueous electrolyte may further include other additives for improving charge/discharge characteristics of the battery and preventing overcharging of the battery. The lithium salt serves as a lithium ion source for the basic operation of the lithium battery. On the other hand, the non-aqueous organic solvent acts as a migration medium for the lithium ions.

Examples of the lithium salt include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_4$, $LiAlCl_4$, $LiN(C_xF_{2x+1}SO_2)(C_yF_{y+1}SO_2)$ (x and y are natural numbers), LiCl, and LiI. These materials may be used alone or in combination.

Examples of the non-aqueous organic solvent may include a carbonate, an ester, and an ether. In order to facilitate the dissociation of the ions, the organic solvent should generally have a high dielectric constant (polar) and a low viscosity. The solvent can be a mixed solvent, including a solvent with a high dielectric constant and viscosity, and a solvent having a low dielectric constant and viscosity.

Figure 2:
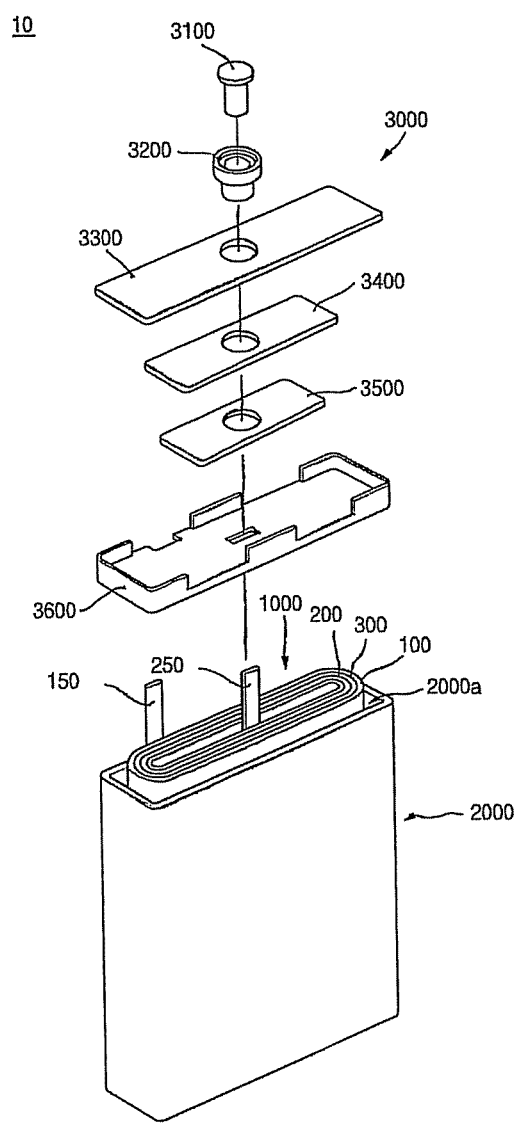
FIG. 2 shows an exploded view of a secondary battery including the electrode assembly of FIG. 1.

FIG. 2 illustrates an exploded view of a secondary battery 10, according to aspects of the present invention. As shown in FIG. 2, the electrode assembly 1000 is fabricated by stacking the separator 300 between the anode 200 and the cathode 100, and winding the resulting structure into a jellyroll-type shape. Therefore, it is possible to significantly improve the capacity of a lithium secondary battery that includes the electrode assembly 1000.

The electrode assembly 1000 is inserted into a can 2000, and an opening 2000a of the can 2000 is sealed by a cap assembly 3000. The can 2000 may be generally rectangular and may be formed of a light-weight metal, such as aluminum (Al). The can 2000 may also serve as a terminal.

The cap assembly 3000 may include an electrode terminal 3100, a gasket 3200, a cap plate 3300, an insulating plate 3400, and a terminal plate 3500, which are stacked on an insulating case 3600. The cap assembly 3000 is attached to the opening 2000a of the can 2000, to seal of the can 2000.

The electrode terminal 3100 is inserted through the gasket 3200, the cap plate 3300, the insulating plate 3400, and a terminal through-hole of the terminal plate 3500. The electrode terminal 3100 is electrically connected to the negative electrode tab 250 of the electrode assembly 1000. The positive electrode tab 150 can be electrically connected to either side of the cap plate 3300, or to the can itself.

Aspects of the present invention will be described in more detail, with reference to the following Examples and Comparative Examples. These examples should not be construed as limiting the scope and spirit of the present invention.

Example 1

100 g of $CoCO_3$, having an average particle size of 0.1 to 2 μm, was added to 200 ml of ethanol, to prepare a cobalt-based precursor solution. Nickel hydroxide, manganese hydroxide, and cobalt hydroxide were precipitated at a stoichiometric ratio, by a precipitation method, to prepare $[Ni_{1/3}Mn_{1/3}Co_{1/3}]O$, which was then stirred into the above ethanol solution. The resultant solution was applied to cobalt-based precursor solution. After the solvent was removed, a $CoCO_3$ powder that was coated with the $[Ni_{1/3}Mn_{1/3}Co_{1/3}]O$ and $Li_2CO_3$ were mixed at a molar ratio of 1:1, and the resulting mixture was calcined at 800° C., for 5 hours, under an oxygen atmosphere and then cooled, to thereby prepare an active material. The active material included aggregated particles of the $LiCoO_2$, having a particle size of 0.1 to 2 μm, that were coated with the $[Ni_{1/3}Mn_{1/3}Co_{1/3}]O_2$.

The active material, a polyvinylidene fluoride binder, and a carbon conductive material (Super P) were dispersed at a weight ratio of 92:4:4, in N-methyl-2-pyrrolidone, to prepare a positive electrode active material slurry. The resulting slurry was coated on aluminum foil having a thickness of 15 μm, dried, and rolled, to fabricate an anode including a positive electrode active material.

Artificial graphite and SiO powder were prepared in the amounts shown in Table 2, below, and suspended in an aqueous carboxymethyl cellulose solution. A styrene-butadiene rubber binder was added to the resulting suspension, to prepare a negative electrode active material slurry. The resulting slurry was coated on copper foil having a thickness of 10 μm, dried, and rolled, to fabricate a cathode.

A polyethylene (PE) film separator having a thickness of 16 μm was disposed between the as-fabricated electrodes, and the resulting electrode assembly was wound, compressed and inserted into a rectangular can. Then, an electrolyte was injected into the can, to fabricate a lithium secondary battery. The electrolyte was a solution of 1 M $LiPF_6$ that was dissolved in a mixed solvent of ethylene carbonate/diethyl carbonate/dimethyl carbonate/fluorobenzene (3:5:1:1, v/v).

Comparative Examples 1 and 2

Comparative Examples 1 and 2 included comparative negative electrode active materials that did not include SiO. Comparative Example 1 and Example 1 included equivalent amounts of their respective negative electrode active materials. Comparative Example 2 included a larger amount of the comparative negative electrode active material, than was included in Comparative Example 1, so as to achieve the same chargeable capacity as Example 1. Other conditions for Comparative Examples 1 and 2 were the same as in Example 1.

TABLE 2

| Example No. | Positive electrode active material | Amount of positive electrode active material (g) | Positive electrode charge capacity (mAh) | Positive electrode discharge capacity (mAh) | Amount of negative electrode active material (g) | Negative electrode additive SiO added (g) |
|---|---|---|---|---|---|---|
| Ex. 1 | NCM | 10.00 | 1900 | 1670 | 4.445 | 0.200 |
| Comp. Ex. 1 | NCM | 10.00 | 1900 | 1670 | 4.445 | 0.000 |
| Comp. Ex. 2 | NCM | 10.00 | 1900 | 1670 | 6.00 | 0.000 |

| | Chargeable capacity of negative electrode (mAh) | Chargeable capacity of negative electrode/practical charge capacity (ratio) | Dischargeable capacity of negative electrode (mAh) |
|---|---|---|---|
| Ex. 1 | 2316 | 1.219 | 1800 |
| Comp. Ex. 1 | 1716 | 0.903 | 1600 |
| Comp. Ex. 2 | 2316 | 1.219 | 2160 |

Example 1 included 4.445 g of the negative electrode active material and 0.2 g of SiO, whereas Comparative Example 1 included 4.445 g of the comparative negative electrode active material. As a result, Example 1 exhibited an increase of about 600 mAh in the chargeable capacity of the negative electrode, as compared to Comparative Example 1. Further, Comparative Example 1 exhibited lithium deposition on its cathode, during charging.

Example 1 and Comparative Example 2 exhibited the same negative electrode chargeable capacities (2316 mAh). However, Example 1 included 4.445 g of the negative electrode active material, whereas Comparative Example 2 included 6 g of the comparative negative electrode active material. Therefore, it can be seen that Comparative Example 2 required an additional 1.505 g of the comparative negative electrode active material, in order to achieve the same negative electrode chargeable capacity as Example 1.

The results of Example 1 and Comparative Examples 1 and 2 indicated that the 0.2 g of the SiO included in the negative electrode active material was sufficient to achieve a chargeable capacity of 2316 mAh, with 4.445 g of the negative electrode active material as a reference amount, whereas an additional 1.505 g of the comparative negative electrode active material was needed to obtain the same chargeable capacity, under the same conditions. Therefore, a small amount of the silicon material can be used to substantially reduce the total amount of the negative electrode active material. The secondary battery can achieve the same cell capacity with less of the negative electrode active material, due to the addition of the silicon material. Accordingly, the capacity of the secondary battery increased.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. A secondary battery comprising:
   a cathode comprising a coating of a positive electrode active material comprising a lithium nickel oxide;
   an anode comprising a coating of a negative electrode active material consisting of a graphite, a binder, a polymer additive, a solvent, and at least one silicon material comprising SiO and reaction byproducts thereof, wherein the SiO is from about 4.5% to 6% by weight, based on the total weight of the negative electrode active material;
   a separator interposed between the anode and the cathode; and
   a non-aqueous electrolyte.

2. The secondary battery according to claim 1, wherein the positive electrode active material further comprises Co and Mn.

3. The secondary battery according to claim 1, wherein an irreversible capacity of the positive electrode active material is larger than an irreversible capacity of the negative electrode active material.

4. The secondary battery according to claim 1, wherein the non-aqueous electrolyte comprises a lithium salt and a non-aqueous organic solvent.

5. The secondary battery according to claim 4, wherein the lithium salt is at least one selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_4$, $LiAlCl_4$, $LiN(C_xF_{2x+1}SO_2)(C_yF_{2y+1}SO_2)$ (x and y are natural numbers), LiCl and LiI.

6. The secondary battery according to claim 4, wherein the non-aqueous organic solvent is at least one selected from the group consisting of a carbonate, an ester, an ether, and a ketone.

7. The secondary battery according to claim 1, wherein:
   the separator is disposed between the anode and the cathode and is then wound therewith to form an electrode assembly, and
   the battery further comprises a can for housing the electrode assembly and a cap assembly for closing an open part of the can.

8. A secondary battery comprising:
   a cathode comprising a positive electrode active material comprising a lithium nickel oxide;
   an anode comprising a coating of a negative electrode active material consisting of a carbon, a binder, a polymer additive, a solvent, and at least one silicon material comprising SiO and reaction byproducts thereof, wherein the SiO is from about 4.5% to 6% by weight, based on the total weight of the negative electrode active material;
   a separator interposed between the anode and the cathode; and
   a non-aqueous electrolyte.

9. The secondary battery according to claim 8, wherein the positive electrode active material further comprises Co and Mn.

10. The secondary battery according to claim 8, wherein the positive electrode active material further comprises a binder.

11. A secondary battery comprising:
- a cathode comprising a coating of a positive electrode active material comprising a lithium nickel oxide;
- an anode comprising a coating of a negative electrode active material consisting of a graphite, a binder, a polymer additive, a solvent, SiO, and reaction byproducts thereof, wherein the SiO is from about 4.5% to 6% by weight, based on the total weight of the negative electrode active material;
- a separator interposed between the anode and the cathode; and
- a non-aqueous electrolyte.

\* \* \* \* \*